United States Patent
Rohani

(10) Patent No.: US 8,856,278 B2
(45) Date of Patent: Oct. 7, 2014

(54) STORAGE SYSTEM FOR PERVASIVE AND MOBILE CONTENT

(75) Inventor: Manu Rohani, Portland, OR (US)

(73) Assignee: Netapp, Inc., Sunnyvale, CA (US)

( * ) Notice: Subject to any disclaimer, the term of this patent is extended or adjusted under 35 U.S.C. 154(b) by 1996 days.

(21) Appl. No.: 11/280,764

(22) Filed: Nov. 16, 2005

(65) Prior Publication Data

US 2007/0112937 A1 May 17, 2007

(51) Int. Cl.
*G06F 15/16* (2006.01)
*H04L 5/00* (2006.01)
*H04N 21/258* (2011.01)
*H04N 21/45* (2011.01)
*G06F 17/30* (2006.01)

(52) U.S. Cl.
CPC ........ *H04L 5/0069* (2013.01); *H04N 21/25841* (2013.01); *H04N 21/4524* (2013.01); *G06F 17/30241* (2013.01); *G06F 2212/312* (2013.01); *Y10S 707/99956* (2013.01)
USPC .............. 709/219; 711/E12.019; 711/E12.04; 711/E12.072; 707/999.205

(58) Field of Classification Search
CPC ............ H04L 5/0069; G06F 17/30241; G06F 2212/312; H04N 21/25841; H04N 21/4524
USPC ....................................................... 709/219
See application file for complete search history.

(56) References Cited

U.S. PATENT DOCUMENTS

| | | | | |
|---|---|---|---|---|
| 5,426,761 A | * | 6/1995 | Cord et al. | 711/114 |
| 5,428,796 A | * | 6/1995 | Iskiyan et al. | 710/240 |
| 5,694,570 A | * | 12/1997 | Beardsley et al. | 711/113 |
| 5,815,656 A | * | 9/1998 | Candelaria et al. | 714/54 |
| 5,982,520 A | * | 11/1999 | Weiser et al. | 398/126 |
| 5,991,775 A | * | 11/1999 | Beardsley et al. | 711/100 |
| 6,587,935 B2 | * | 7/2003 | Ofek | 711/162 |
| 6,687,846 B1 | * | 2/2004 | Adrangi et al. | 714/4 |
| 7,051,182 B2 | * | 5/2006 | Blumenau et al. | 711/202 |
| 7,111,061 B2 | * | 9/2006 | Leighton et al. | 709/224 |
| 7,146,463 B2 | * | 12/2006 | Mukker et al. | 711/114 |
| 7,383,294 B1 | * | 6/2008 | Tamer et al. | 707/205 |
| 2002/0002661 A1 | * | 1/2002 | Blumenau et al. | 711/165 |
| 2003/0114190 A1 | * | 6/2003 | Want et al. | 455/557 |
| 2003/0130986 A1 | * | 7/2003 | Tamer et al. | 707/1 |
| 2003/0154277 A1 | * | 8/2003 | Haddad et al. | 709/224 |
| 2003/0200478 A1 | * | 10/2003 | Anderson | 714/5 |

(Continued)

OTHER PUBLICATIONS

A New Disruptive IP Storage Technology Paves the Way for Advanced, Cost-Effective, and Protected Storage for Corporate and Consumer Networks; Global Headquarters: 5 Speen Street, Framingham, MA 01701 USA; www.idc.com.

(Continued)

*Primary Examiner* — Arvin Eskandarnia
(74) *Attorney, Agent, or Firm* — Haynes and Boone, LLP

(57) ABSTRACT

A system and method for storage and retrieval of pervasive and mobile content is provided. System may be comprised of a controller and a plurality of storage devices. Plurality of storage devices may include a first storage device located in a first geographic location and a second storage device located in a second geographic location. The controller may be operably connected to each storage device. The controller may also be capable of locating a first storage device containing data and transferring the data between the first storage device and a second storage device. The second storage device may be capable of transferring data to a host, which may be operably connected to the second storage device.

6 Claims, 4 Drawing Sheets

(56) References Cited

U.S. PATENT DOCUMENTS

| | | | |
|---|---|---|---|
| 2003/0220982 A1* | 11/2003 | Tran et al. | 709/218 |
| 2004/0054866 A1* | 3/2004 | Blumenau et al. | 711/202 |
| 2004/0103261 A1* | 5/2004 | Honda et al. | 711/202 |
| 2005/0044312 A1* | 2/2005 | Blumenau et al. | 711/113 |
| 2005/0246393 A1* | 11/2005 | Coates et al. | 707/200 |
| 2005/0278484 A1* | 12/2005 | Mukker et al. | 711/114 |
| 2006/0083230 A1* | 4/2006 | Ol | 370/389 |
| 2006/0195676 A1* | 8/2006 | Honda et al. | 711/202 |
| 2006/0212747 A1* | 9/2006 | Okamoto et al. | 714/6 |
| 2008/0177860 A1* | 7/2008 | Khedouri et al. | 709/217 |

OTHER PUBLICATIONS

Personal Network Drives, A Better Way to Store, Share and Protect Digital Content in the Home; Ryan Malone; May 10, 2005.

Google's Patents Reveal Strategy to Beat Microsoft; W. David Gardner; Sep. 30, 2005; http://www.techweb.com/article/printableArticleSrc.jhtml?articleID=171202256.

Google is Building Massive Core Network: Report; Sep. 21, 2005; http://www.networkingpipeline.com/shared/article/printableArticleSrc.jhtml?articleId=171000517.

Google wants "dark fiber"; Evan Hansen; Jan. 17, 2005; http://news.com.com/2102-1034_3-5537392.html?tag=st.util.pint.

\* cited by examiner

STORAGE SYSTEM FOR PERVASIVE AND MOBILE CONTENT

FIELD OF THE INVENTION

The present invention generally relates to the field of storage systems and in particular to a storage system for pervasive and mobile content.

BACKGROUND OF THE INVENTION

Electronic data storage is one of the most important aspects of the modern economy. Almost every aspect of modern life has some element that requires the storage and retrieval of electronic data. As technology advances, storage needs are increasing exponentially. Specifically, storage requirements are becoming significantly greater due to developments such as digital music, digital photography, digital information stored on personal digital assistants (PDAs), internet protocol television (IPTV), personal digital communications, blogs, podcasts, peer-to-peer networking, interactive gaming and the like. These technologies rely heavily on the usage of communications networks such as wired or wireless broadband internet connections and high level, hardware disk based encryption. However, designers and manufacturers of hard storage are rapidly approaching the limit of current hard disk drive media storage densities, creating a need for alternative storage and retrieval technology that does not require a reduction in hard drive size. Additionally, purchasing and maintaining high-end, high bandwidth storage is often cost prohibitive for individual users who desire increased data mobility and availability.

Existing solutions to the problem of high storage demand include internet based storage, such as that provided by Yahoo, MSN, file swapping services, streaming delivery services and the like. Specifically, these storage services provide users with an amount of storage space where users may store and access files. Often, these files are accessed remotely, from a location other than that where the data was originally stored. However, internet based storage is relatively slow and often user initiated, requiring a user to set up an account and reserve space that is typically accessed only by logging into the account. Additionally, this method of storage becomes particularly problematic with the increase of travel and mobility, where users may forget to store necessary data before departing one location, and may not realize the error until arriving at a second location.

Therefore, it would be desirable to provide a system and method for storage and retrieval of pervasive and mobile content.

SUMMARY OF THE INVENTION

Accordingly, the present invention is directed to a novel system and method for storage and retrieval of pervasive and mobile content. In a first aspect of the present invention, storage system may be an integrated collection of one or more controllers, one or more data storage devices, and control software that may provide storage services to a host. One or more controllers may be operably coupled to one or more other controllers in the storage system. An individual controller may be operably coupled to one or more storage devices. Individual storage devices may be located in distinct geographic areas. Individual controllers may manage one or more storage devices and transfer data from one storage device physically located at one geographic area to another storage device physically located at another geographic area. Data may be transferred to a host from a local storage device and communicate diagnostic information to each controller in the system. In addition, individual storage devices may be operably coupled to one another to allow all components of storage system to communicate.

In accordance with an additional aspect of the present invention, a method of storage and retrieval for pervasive and mobile content is provided. Method may receive a data request from a host. Method may determine the location of a storage device containing the data and the location of one or more local storage devices. Method may then transmit data from the remote storage device to an available local storage device. Method may transfer data to a host from a local storage device upon transmission of the data from the remote storage device to the local storage device.

It is to be understood that both the forgoing general description and the following detailed description are exemplary and explanatory only and are not restrictive of the invention as claimed. The accompanying drawings, which are incorporated in and constitute a part of the specification, illustrate an embodiment of the invention and together with the general description serve to explain the principles of the invention.

BRIEF DESCRIPTION OF DRAWINGS

The numerous advantages of the present invention may be better understood by those skilled in the art by reference to the accompanying figures in which.

DETAILED DESCRIPTION

The present invention provides a system and method for storage and retrieval of pervasive and mobile content. Reference will now be made in detail to the presently preferred embodiments of the invention, examples of which are illustrated in the accompanying drawings.

Figure 1:
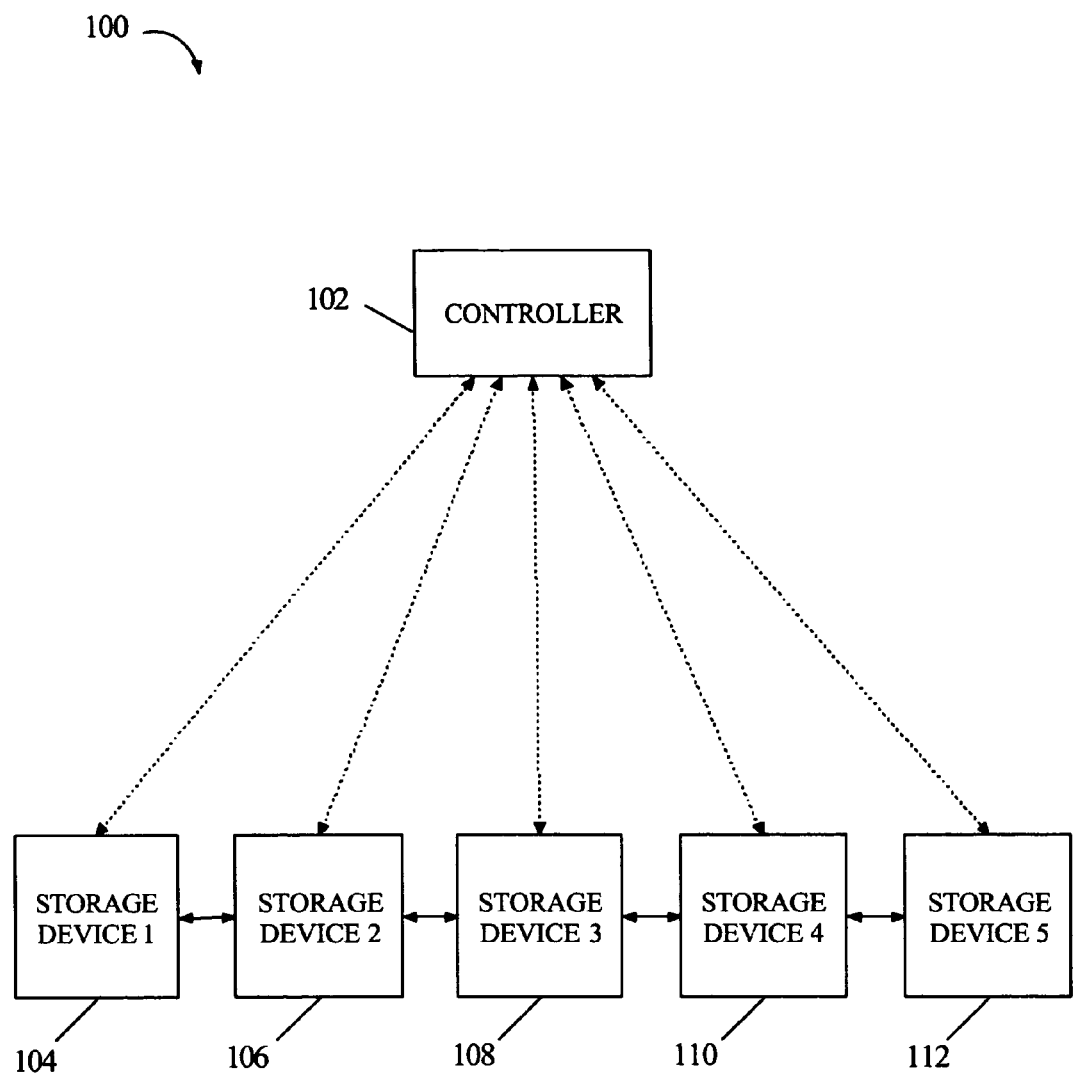
FIG. 1 depicts a block diagram of a storage system in accordance with an exemplary embodiment of the present invention.

Referring to FIG. 1, a block diagram of a storage system 100 in accordance with an exemplary embodiment of the present invention is shown. Storage system 100 may be substantially comprised of one or more controllers 102, one or more data storage devices 104-112 such as disks, CD-ROMs, tapes, media loaders, and the like, and control software that may provide storage services to a host such as a server on a network, a Web server on the Internet, a mainframe computer, or the like. Controller 100 may be operably coupled to each of the individual storage devices 104-112 of the storage system 102 as well as any other controller in the storage system 100. For example, controller 102 may be connected via a communication medium to storage devices 104-112 and any other controllers in the storage system. Specifically, controller 102 may receive I/O requests and process the requests, reading or writing as appropriate from or to storage devices. Controller 102 may utilize its local cache memory to speed response of common I/O requests.

Storage system 100 may employ caching to store and retrieve data. In a preferred embodiment, storage system 100 may employ disk caching for transmitting and receiving data between a host and the storage system. Disk caching may utilize conventional main memory such as dynamic RAM (DRAM). The most recently accessed data from a disk, as well as adjacent sectors, may be stored in a memory buffer. A program may first determine if the data is located in the disk cache. If the data is located in the disk cache, the data may be read and transmitted to the host. If the data is not in the disk cache, the data may be read from a disk drive and transmitted to the host via the disk cache. In an alternative embodiment, storage system 100 may employ memory caching to store and retrieve data. Memory caching is substantially similar to disk caching, however, in contrast to the generally lower speed memory utilized in disk caching, memory caching utilizes high-speed memory such as high speed static RAM (SRAM). Storage system 100 may further provide scalable memory capacity. For example, storage system 100 may be expandable, and may increase or decrease as storage demands fluctuate. Further, cache memory of individual storage devices 104-112 may be increased or decreased according to specific storage needs. These storage needs may include increased user demand, demands from improving technology and demands from computational requirements.

Storage system 100 may create redundancy in a scalable and flexible manner across the devices by the controller choosing which devices will participate in which redundancy RAID scheme as needed. RAID may refer to a redundant array of inexpensive disks, as is known in the art. A RAID may be a set of two or more hard drives utilized in conjunction to increase performance and provide fault tolerance. In a preferred embodiment, a RAID may include multiple hard drives and a specialized disk controller containing the RAID functionality. It is generally known that all RAID arrays include a redundancy mechanism to protect against disk failure. It is contemplated that one or more devices may participate in one or more redundancy RAID schemes. For example, a RAID array included in the present invention may be RAID 0, RAID 1, RAID 2, RAID 3, RAID 4, RAID 5, RAID 10, RAID 10.5 or any other known or unknown RAID level not specifically enumerated.

In an embodiment of the invention, storage system 100 may be implemented for content in a pervasive content environment. A pervasive content environment refers generally to an environment that allows users to access information or content from any location at any time. Storage system 100 may provide transient storage capacity and availability by creating pervasive and transient storage clouds. Coverage area may be created by storage system storage devices 104-112 operably coupled to one another and to one or more storage system controllers 102. It is contemplated that a first storage device 104 may be located in a distinct geographical area from a second storage device 106. Furthermore, all storage devices 104-112 may be physically located in distinct geographic locations. For example, a first storage device 104 may be located in New York, and a second storage device 106 may be located in California. Information may be managed and accessed by storage controller. Specifically, controller 102 may create and utilize multiple data banks for storage and retrieval of data. Controller 102 may communicate to one or more other controllers to transfer data or data banks from one location to another. In addition, one or more controllers may access and control one or more storage devices to make them available as storage capacity.

Storage system 100 may reduce pervasive content environment latency variability due to the homogeneity of storage system storage devices 104-112. Storage system 100 may minimize latency variations by providing edge of network application delivery when stored information is requested by a user. For example, a user connected to a network may automatically access data stored in any storage device located at any location within the storage system infrastructure. Storage system 100 may receive a request for information from a user. User may not be located at the geographic site where the user or another party initially stored the requested information. Storage system may locate the storage device containing the requested information and make it available to a user via a local storage system storage device 104-112 to which the data has been transmitted. Local storage device 104-112 may transfer information to a user's information retrieval device without perceived latency. In an embodiment of the invention, data may be streamed from a local storage device to a host.

Figure 2:
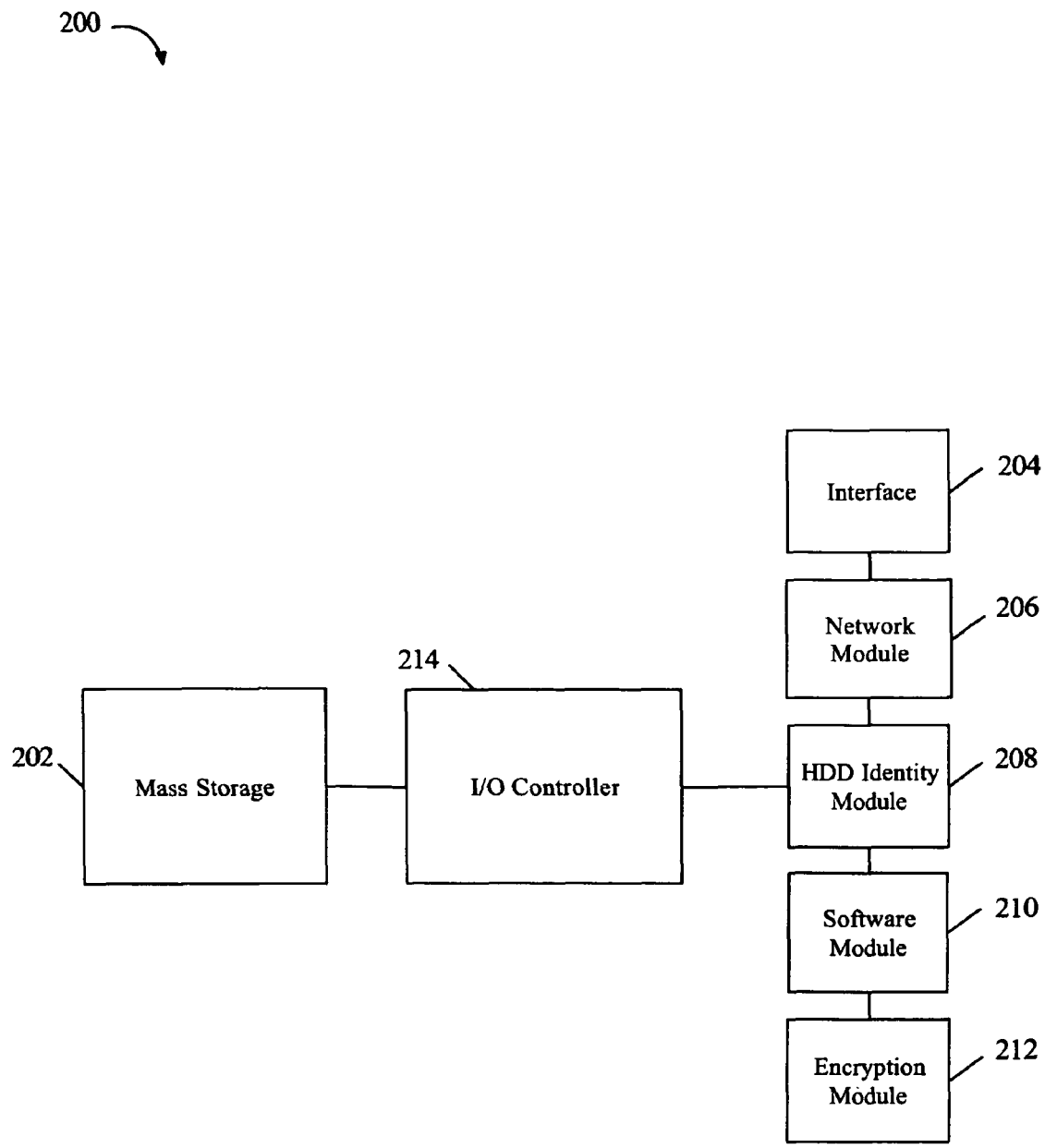
FIG. 2 depicts a block diagram of an individual storage device of a storage system in accordance with an exemplary embodiment of the present invention.

Referring to FIG. 2, a block diagram representing a physical architecture of an individual storage device 200 that may be utilized in a storage system 100 in accordance with an exemplary embodiment of the present invention is shown. Storage system may include one or more individual storage devices 200 communicatively coupled to one or more controllers 102 of the storage system 100. Each storage device 200 may communicate diagnostic information to one or more controllers programmed for communication with a storage device 200. For example, storage devices may communicate capacity, availability, system condition and the like to one or more controllers in a storage system. In addition, individual storage devices may be operably coupled to one another to allow all components of storage system to communicate.

An individual storage device 200 of the present invention may include a main data storage component housing. Housing may contain mass storage 202 and any other hardware or software necessary for functionality of a storage device 200, and may be customized to include additional hardware or software as desired by a user. Storage means may be conventional mass storage 202 for storing data. For example, storage means may be a hard disk drive, a direct access storage device, an optical drive, e.g., a CD drive, a DVD drive, etc., and/or a tape drive, among others, that may be connected directly or may be connected through a SAN or other network. Storage device 200 may also include a storage and access mechanism such as a magnetic head and drive mechanism. In a preferred embodiment, mass storage 202 may be a magnetic disk such as a hard disk on which computer data may be stored. A single hard disk generally consists of several read/write platters. For example, each platter may require two read/write heads, one for each side. All read/write heads may be attached to a single access arm, and each platter may have an identical number of tracks, as well as a track location that cuts across all platters, generally referred to as a cylinder. For example, a typical 84 megabyte hard disk for a PC might have two platters (four sides) and 1,053 cylinders. Storage device 200 may also include a microprocessor, a microcode ROM, a drive controller, a data separator, a formatter/buffer controller, and an internal bus. Microprocessor may access and control each of the other components of the storage device through the internal bus.

Storage device 200 may include a plurality of modules, such as a network module 206, a hard disk drive identity module 208, a software module 210, and encryption module 212. A network module 206 may be a communications network module. For example, network module 206 may include a wired network module, a wireless local area network (WLAN) network module, a wireless wide area network module (WWAN), and the like. Individual storage device network modules 206 may vary depending upon the environment in which the storage device 200 may be located. For example, in one location, it may be more suitable for network module 206 to be a wired network module, and in a second location, it may be more suitable for network module to be a wireless network module.

Hard disk drive identity module 208 may be a smart autonomous device that is designed to allow a storage device 200 to scan across a storage system network. A smart autonomous device may refer to an autonomous device containing a memory chip and/or microprocessor capable of adding, deleting and manipulating information on the card. By maintaining all necessary functions and information on the autonomous device, a hard disk drive identity module 208 may not require access to remote databases.

A software module 210 may be a search index software module, and may implemented as a collection of routines and data structures that performs particular tasks or implements a particular abstract data type. A software module 210 may be comprised of two parts. First, a software module may list the constants, data types, variables, routines and the like that that can be accessed by other modules or routines. Second, a software module can be configured as an implementation, which can be private (i.e., accessible perhaps only to the module), and that contains the source code that may implement the routines or subroutines upon which the module is based. Thus, for example, the term software module, as utilized herein may refer to a software module or an implementation thereof. Such software modules may be utilized separately or together to form a program product that may be implemented through signal-bearing media, including transmission media and recordable media.

Encryption module 212 may be a software implemented plug-in encryption module for securing data, and may not require additional hardware to integrate into other modules of the storage device 200. Encryption module 212 may encrypt data on a storage device and transmit encrypted data to a backup device. Encryption module 212 software may provide for restoration by transmitting encrypted data and decrypting data on a restoration target device. Further, encryption module may allow only a designated user to request data from a storage device. This may be accomplished by users having to enter unique login identification information prior to requesting data.

Storage device 200 may further include an interface 206, and hard drive I/O controller 214. In a preferred embodiment, interface 206 may be a hardware configuration interface. A hardware configuration interface may generally refer to a software interface that allows applications to read or setup hardware configurations while concealing differences in hardware and software. It is further contemplated that individual storage devices may be comprised of any combination of software and hardware tools, modules and protocols as desired by a user to allow utilization of storage capacity for multiple use cases.

Figure 3:
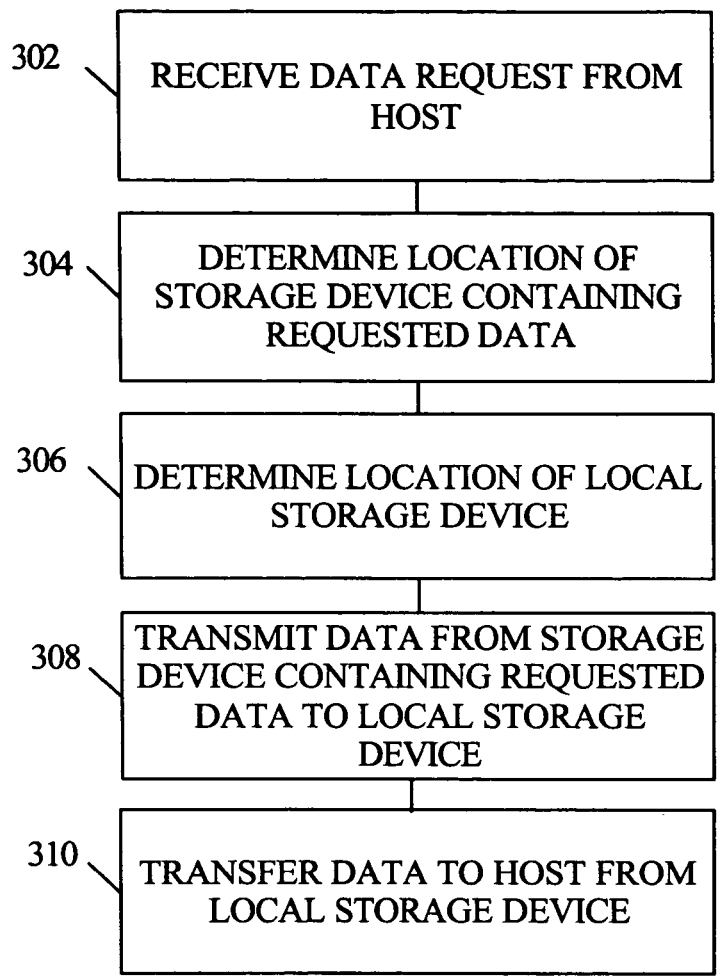
FIG. 3 depicts a flowchart representing a method for providing storage in accordance with an exemplary embodiment of the present invention.

Referring to FIG. 3, a flowchart depicting a method 300 for providing storage for pervasive and mobile content is shown. In a preferred embodiment, method 300 may be implemented by storage system, for locating a first storage device containing requested data and transmitting requested data from the first storage device to a second storage device. Method 300 may receive a data request from a host 302. Host may be an interface connected to one or more networks, e.g., a local-area network, a wide-area network, a wireless network, and/or the Internet, among others, to permit communication of information with other computers coupled to the network. For example, host may be a server on a network, a Web server on the Internet, a mainframe computer, a personal communications device, a personal computing device or the like. Method 300 may determine the location of a first storage device containing the requested data 304 and the location of one or more local storage devices 306. Method 300 may then transmit data from the first storage device to an available local storage device 308. Method may transfer data to host 310 from the available local storage device. Host may be operably connected to one or more local storage devices. Additionally, it is contemplated that host may be located in closer geographic proximity to local storage device than first storage device where data was originally stored.

Method 300 may be implemented with or without user input and with or without user awareness that data may be transferring from a local storage device. Requested data may be partially stored on host and partially received from storage device. Alternatively, data may be stored in a remote storage device in its entirety. It is contemplated that controller may access data from two or more remote storage devices for transmission to a local storage device. It is further contemplated that method may allow usage of storage capacity for single or multiple use cases.

Figure 4:
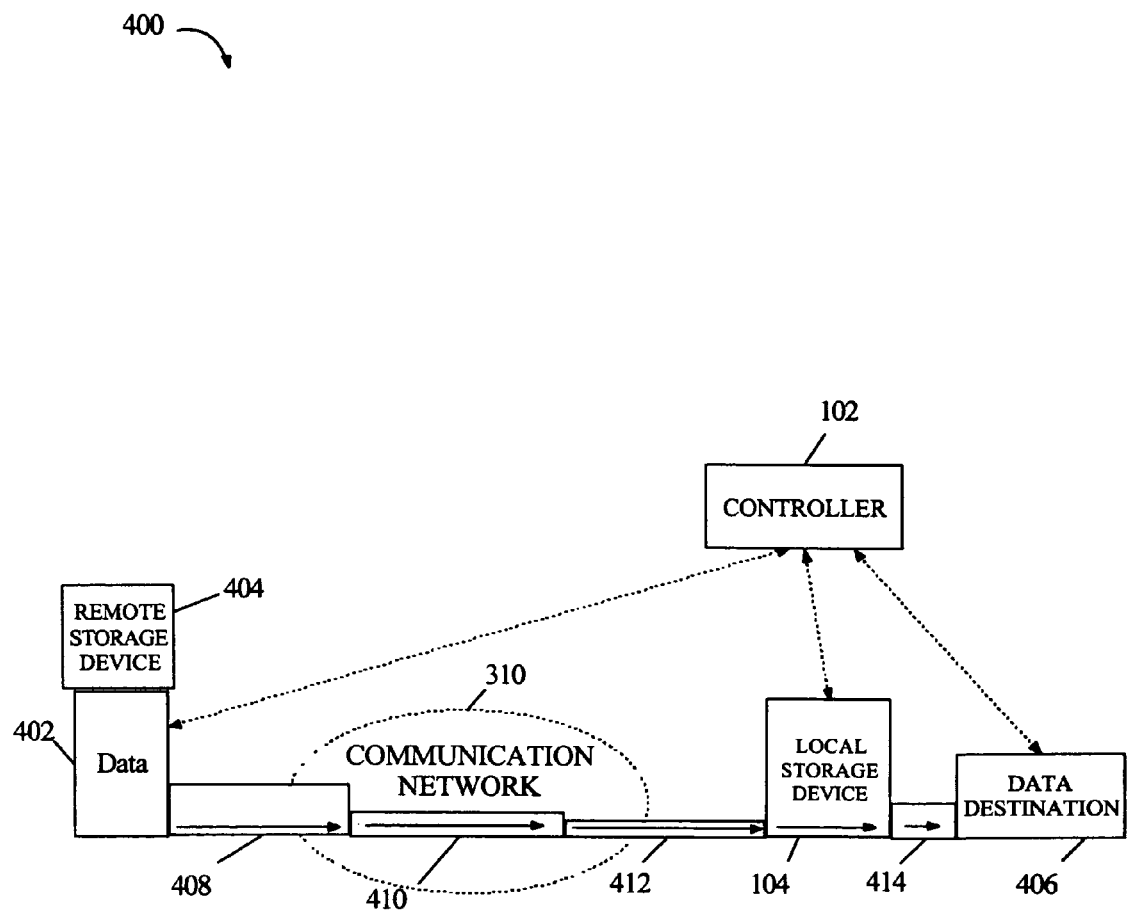
FIG. 4 depicts a block diagram representing an exemplary example of a storage system in accordance with the present invention.

Referring to FIG. 4, an illustration of a storage system in accordance with the present invention implemented in a typical data transfer is shown. Local storage device may buffer data. Buffering data may increase data transfer rate and provide delivery of data at the highest available transfer rate for a specific location. In a preferred embodiment, data 402 may be located at a remote storage device 404. Data may be requested by a data destination 406. Data 402 transferred to a data destination 406 may be subject to varying data transfer rates 408-412. For example, data may be transferred at an initial data transfer rate 408. However, data transferred via a communication network 410 such as a wired or wireless network may be subject to latency as it travels from a remote storage device 404 to a data destination 406. As the data rate degrades to a lower data transfer rate 410-412, the available data transfer rate may be significantly reduced at a desired destination. In some instances, data transfer rate 408 may be lower than the highest available data transfer rate at a particular destination. Storage system 100 may buffer data through an available system storage device and deliver data at higher data transfer rate 414 to a data destination. For example, controller 102 may be aware of the remote storage device 404 location, the data destination location and the location of one or more system storage devices 104 within close proximity to the desired data destination 406. In a preferred embodiment, storage system 100 may deliver data to a destination at the highest available data transfer rate for the specific location. In alternative embodiments, transfer rate may be determined by controller or user, and may be lower than highest available transfer rate.

In an exemplary example, the present invention may be implemented with technologies such as Internet Protocol Television (IPTV). IPTV describes a system where a digital television service is delivered to subscribing consumers using the Internet Protocol over a broadband connection. This service is often provided in conjunction with services such as Video on Demand and may also include Internet services such as Web access and VOIP, where it may be called Triple Play and is typically supplied by a broadband operator using the same infrastructure. For example, an IPTV subscriber may request a movie from the service. The requested movie may be made available to the subscriber for a number of days, typically, 30 days. An IPTV provider may transmit the movie to the subscriber's IPTV receiver box. The IPTV receiver box may begin streaming the content and request a local storage system device to cache the rest of the movie without sending the content through the subscriber's broadband connection. Upon receiving such an instruction, the IPTV provider may offload the movie into the local storage system device. The subscriber's IPTV receiver box may access the content as needed at maximum capacity, to ensure a high quality transmission.

In an additional exemplary example of the present invention, an animator located in City A may have 50 GB of animation and rendering files for a client, who may be located in City B. The animator's laptop may contain 30 GB native storage and use unlimited storage system device storage in the neighborhood office. Therefore, what may appear as a 50 GB folder of files on the laptop may be 5 GB on the laptop and 45 GB stored to a storage system device. The animator may travel to a distant location such as City B to present the work to the client. Upon powering on her computer in the client's conference room, software on the laptop may recognize that the data is stored to a storage system device that is not in close proximity, and may contact the client's data cloud through a wired or wireless LAN to access the data nearer to the animator's current location. The animator may begin the presentation while the local storage system device streams data to the laptop. All steps of the system may be accomplished without a user knowing the actual size of the laptop's hard disk or how data reached the laptop. Storage system 100 may manage the steps and further ensure that any RAID or redundancy requirements are met.

In a further exemplary example, a computing device such as a personal computer may be replaced by slot terminals, capable of receiving digital communications devices such as cellular phones. For example, a cellular phone may contain a user's settings, application software and an index of data. The index may be substantially smaller than actual data. A slot terminal may contain the main CPU and storage system based storage. Inserting a digital communications device into a slot terminal may configure the system to a user based on the information stored in the cellular phone, including what information to access from the storage system 100.

In further exemplary embodiments, the methods disclosed may be implemented as sets of instructions or software readable by a device. Further, it is understood that the specific order or hierarchy of steps in the methods disclosed are examples of exemplary approaches. Based upon design preferences, it is understood that the specific order or hierarchy of steps in the method can be rearranged while remaining within the scope and spirit of the present invention. The accompanying method claims present elements of the various steps in a sample order, and are not meant to be limited to the specific order or hierarchy presented.

It is believed that the system and method for providing pervasive and mobile content storage of the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. A system for storing and retrieving pervasive and mobile content comprising:
   a controller;
   a plurality of storage devices, said plurality of storage devices including a first storage device located in a first geographic area and a second storage device located in a second geographic area, said plurality of storage devices being operatively coupled to said controller, each storage device of said plurality of said storage devices further comprising:
   a storage device component housing;
   an interface;
   a network module, said network module including a wireless local area network transmitter;
   a hard disk drive identity module;
   a software module;
   an encryption module;
   a hard drive I/O controller; and
   a host, said host being operably coupled to said controller, wherein said host is configured to request a data block from said controller, said controller is configured to determine a location of storage of said data block, transfer the data block from a storage device of said plurality of storage devices which has stored the data block and transfer the data block to a storage device of said plurality of storage devices that is located in proximity to said host, wherein said storage device located in proximity to said host is configured to stream said data block to said host via said wireless local area network transmitter.

2. The storage system of claim 1, wherein said host is a server on a network, a Web server on the Internet, a mainframe computer, a personal communications device, or a personal computing device.

3. The storage system of claim 1, wherein said software module is a search index software module.

4. The storage system of claim 1, wherein said encryption module is a plug-in encryption module.

5. The storage system of claim 1, wherein said interface is a hardware configuration interface.

6. The storage system of claim 1, wherein said controller creates redundancy in a scalable and flexible manner across said plurality of storage devices by the controller choosing which of said plurality of devices will participate in a redundancy RAID scheme.

* * * * *